Feb. 24, 1953     R. H. COVINGTON     2,629,611
STABILIZING AND TOWING ATTACHMENT FOR BICYCLES
Filed Jan. 6, 1949     3 Sheets-Sheet 1
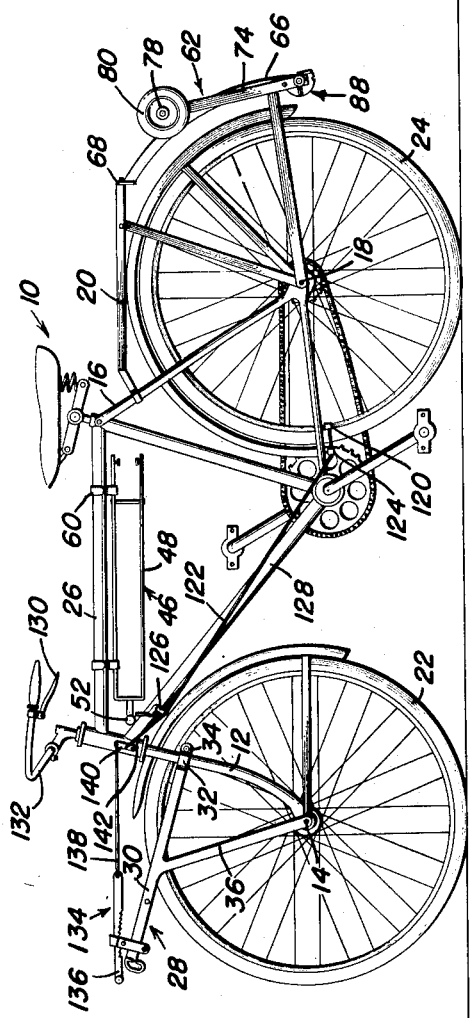
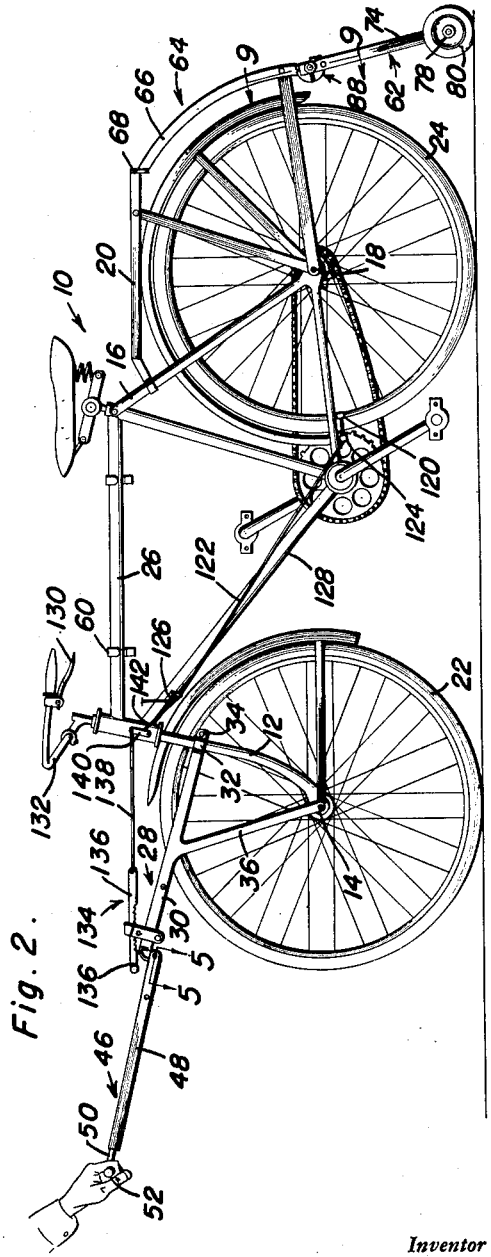
Inventor
Robert H. Covington
By *Clarence A. O'Brien and Harvey B. Jacobson*
Attorneys Feb. 24, 1953 R. H. COVINGTON 2,629,611
STABILIZING AND TOWING ATTACHMENT FOR BICYCLES
Filed Jan. 6, 1949 3 Sheets-Sheet 2
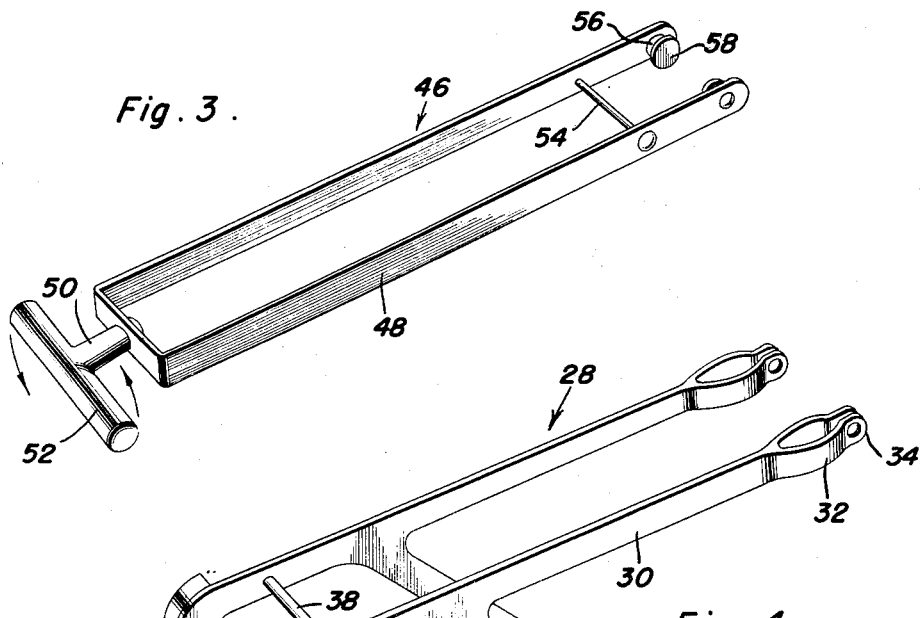
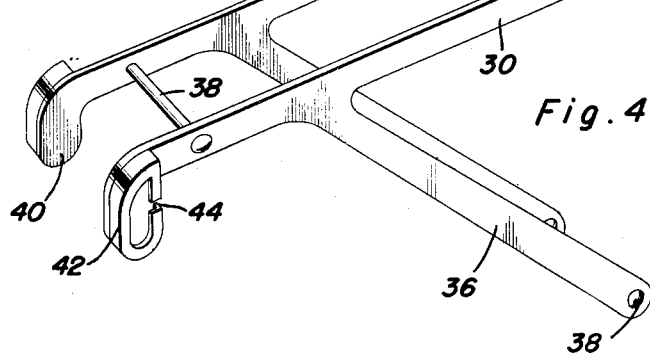
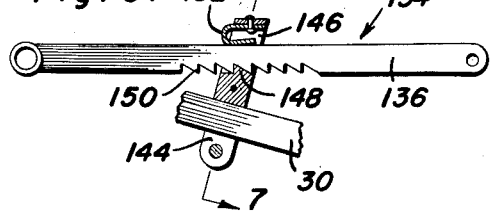
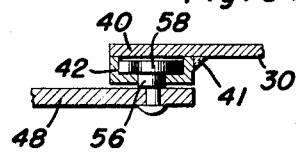
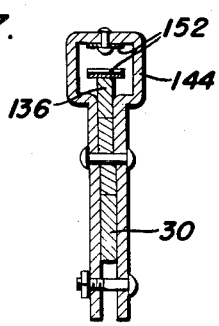
Inventor
Robert H. Covington
By *Clarence A. O'Brien and Harvey B. Jacobson*
Attorneys Feb. 24, 1953 R. H. COVINGTON 2,629,611
STABILIZING AND TOWING ATTACHMENT FOR BICYCLES
Filed Jan. 6, 1949 3 Sheets-Sheet 3
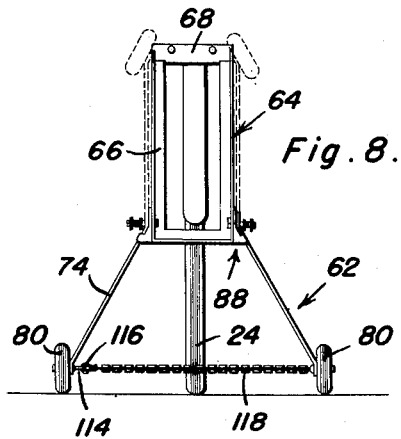
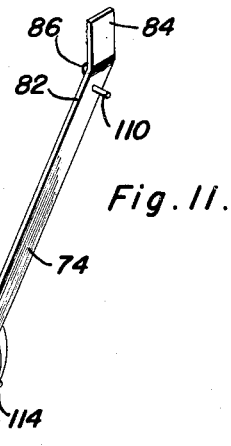
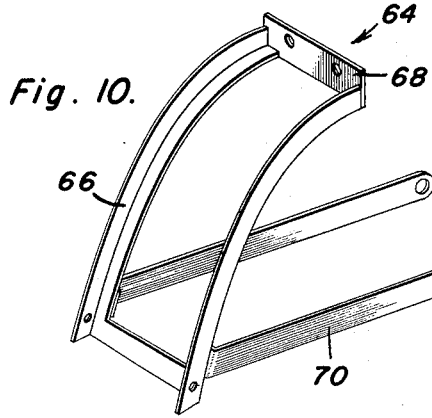
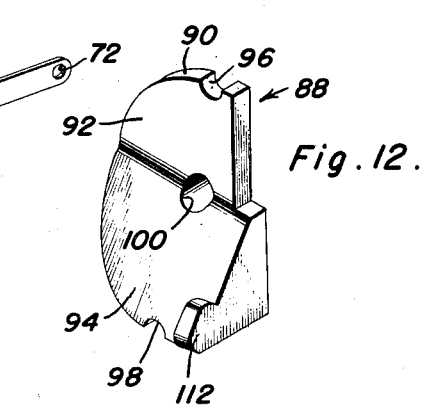
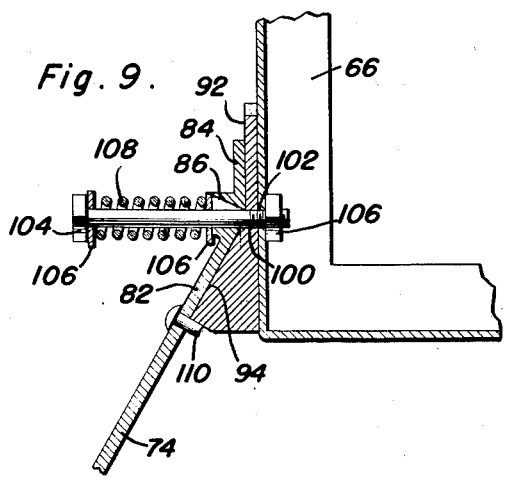
Inventor
Robert H. Covington Patented Feb. 24, 1953

2,629,611

UNITED STATES PATENT OFFICE 2,629,611

STABILIZING AND TOWING ATTACHMENT FOR BICYCLES

Robert H. Covington, Bradley, Ark.

Application January 6, 1949, Serial No. 69,464

7 Claims. (Cl. 280—292)

1

This invention relates to new and useful improvements in bicycles and the primary object of the present invention is to provide a stabilizing and towing attachment for bicycles that will permit a bicycle to be conveniently pulled by a person or vehicle in advance thereof without the said bicycle overtipping.

Another important object of the present invention is to provide a towing and stabilizing attachment for bicycles including a vertically swingable wheel supporting frame adapted to furnish the balancing means for a bicycle and embodying novel and improved means for locking the frame in a raised or lowered position.

A further object of the present invention is to provide a stabilizing and towing attachment for bicycles including a handle support, and a novel and improved manually operable brake operating mechanism conveniently placed with respect to said support for operating the wheel brakes of a bicycle.

A further feature of the present invention is to provide an attachment for bicycles and the like including a forward support that is detachably mounted on the forward fork and axle of a bicycle, a hand lever removably applied to the support, and means associated with the crossbar of the bicycle for supporting the lever when the latter is not in use.

A still further aim of the present invention is to provide a stabilizing and towing attachment for bicycles that is simple and practical in construction, small and compact in structure, neat and attractive in appearance, strong and reliable in use, efficient and durable in operation, relatively inexpensive to manufacture, quickly and readily applied to or removed from a bicycle, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention applied to a bicycle with the parts thereof in an unused position;

Figure 2 is a view similar to Figure 1 and showing the parts of the present invention in use;

Figure 3 is a perspective view of the hand receiving lever used in conjunction with the present invention;

Figure 4 is a perspective view of the forward support used in conjunction with the present invention;

2

Figure 5 is an enlarged sectional view taken substantially on the plane of section line 5—5 of Figure 2 and showing the manner in which the hand receiving lever is pivoted to the forward support;

Figure 6 is a fragmentary side elevational view of the brake actuating mechanism that is used in conjunction with the present invention;

Figure 7 is an enlarged sectional view taken substantially on the plane of section line 7—7 of Figure 6;

Figure 8 is a rear elevational view of Figure 2, and showing the raised position of the wheeled frame in dotted lines;

Figure 9 is an enlarged sectional view taken substantially on the plane of section line 9—9 of Fig. 2 and showing the manner in which the wheeled frame is applied to the rear support;

Figure 10 is a perspective view of the rear frame that is used in conjunction with the present invention;

Figure 11 is a perspective view of one of the wheel supporting arms used in conjunction with the present invention; and, Figure 12 is a perspective view of one of the locking plates used in conjunction with the present invention.

Referring now to the drawings in detail, wherein for the purpose of illustration, there is disclosed a preferred embodiment of the present invention, the numeral 10 represents a bicycle generally, including a forward fork 12 that supports a forward axle 14, a rear fork 16 that supports a rear axle 18, a rear panel 20 that is supported by the rear fork and rear axle, forward and rear wheels 22 and 24 journaled on the forward and rear axles respectively, and a crossbar 26.

The numeral 28 represents the forward support or framework that is used in conjunction with the present invention generally, and which includes a pair of forwardly and upwardly inclined arms 30 having inner split eye terminals or clamps 32 that embrace the legs of the forward fork 12. The free, normally spaced ends 34 of the eye terminals 32 are provided with suitable openings that receive bolts and nuts for clamping the eye terminals to the legs of the fork 12.

Depending from the arms 30 is a pair of downwardly and rearwardly inclined brace arms or supports 36 having apertures 38 in their free ends for receiving the forward axle 14.

Adjacent the forward ends of the arms 30 there is provided a cross bar or rod 38 that connects the arms 30 and which retains the arms 30 spaced relative to each other.

The forward ends of the arms 30 are provided with downwardly projecting, lateral extensions 40 to the outer faces of which there is suitably secured, by welding or the like 41, substantially C-shaped keepers 42 that are angular in cross section, as shown best in Figure 5 of the drawings. A space 44 is provided between the ends of the keepers 42 for a purpose which will later be more fully described.

Lever means are provided in conjunction with the forward support 28 and is represented generally by the numeral 46. This lever means consists of a substantially U-shaped member 48 the web of which rotatably supports the shank portion 50 of a hand grip 52. The legs of the member 48 are braced and retained in spaced relationship by a cross member or rod 54.

Suitably secured to the legs of the member 48, adjacent the free ends thereof, is a pair of inwardly extending lugs 56 having head portions 58. These lugs 56 pass through the openings 44 in the keepers 42 and the head portions 58 of the lugs are positioned between the keepers and the extensions 40 (see Fig. 5) for swinging movement of the lever means 46 relative to the forward support 28.

The lever means 46 is applied to the forward support 28 when the bicycle is being towed or pulled, however, when the lever means is not in use it is suspended beneath the cross bar 26 by suitable brackets 60 mounted on the said cross bar (see Fig. 1).

In order to stabilize the bicycle and to prevent overtipping of the same as it is being towed or pulled, there is provided a wheeled frame designated generally by the numeral 62 that is pivotally secured to a rear support or framework that is designated generally by the numeral 64.

The rear support 64 includes a pair of arcuate side members 66 the upper ends of which are joined by a cross-strip or plate 68 that is removably secured to the rear portion of the panel 20 by any suitable means. Brace arms 70 project forwardly from the lower ends of the side members 66 and are formed with suitable openings 72 that receive the rear axle 18.

The wheeled frame 62 is composed of a pair of levers or legs 74 the lower ends of which support outwardly directed stub axles 76 carrying wheels 78 having rubber treads 80 and the upper ends 82 of the legs 74 are provided with angulated extensions 84 and outwardly directed bearing sleeves 86.

Interposed between the legs 74 and the lower ends of the side members 66, is a pair of locking plates designated generally by the numeral 88 that include outer arcuate edges 90. The upper portions of the plates 88 are substantially flat to provide substantially vertical surfaces 92 whereas the lower portions of the locking plates are substantially triangular in cross section to provide downwardly and outwardly sloping surfaces 94.

Upper and lower peripheral notches or recesses 96 and 98 are provided in the edges 90 of the locking plates for a purpose which will later be more fully apparent.

The locking plates 88 are provided with openings 100 that register with the sleeves 86 and suitable apertures 102 formed in the lower ends of the side members 66, and bolts 104 are extended through the sleeves 86, openings 100 and apertures 102 with the threaded ends of the bolts supporting nuts 104 that bear against the side members 66.

Pairs of washers 106 are received on the bolts 104 and bear against the sleeves 86 and coil springs 108 embrace the bolts 104 and are biased between the pairs of washers 106 to normally urge the extensions 84 and end portions 82 against the locking plates 88 (see Fig. 9).

Locking pins or lugs 110 are suitably secured to and project outwardly from the end portions 82 for selectively entering the recesses 96 and 98.

Stops 112 project from the surfaces 94 and limit the downward swinging movement of the legs 74 relative to the rear support 64.

It should be noted, that when the legs 74 are in a lowered position, as shown in Figures 8 and 9, the pins 110 are received in the notches 98, the extensions 84 bear against the surfaces 92 of the locking plates, and the end portions 82 of the legs 74 bear against the surfaces 94 of the locking plates, to retain the legs in a downwardly and outwardly inclined position.

When the legs 74 are raised, the pins 110 are received in the notches 96, the extensions 84 bear against the surfaces 94 and the end portions 82 of the legs 74 bear against the surfaces 92 to retain the legs in a substantially vertical position as shown in full lines in Figure 1 and dotted lines in Figure 8, it being understood, that the extensions 84 will clear the stops 112 as the legs 74 are swung downwardly and that sufficient play will be present in the sleeves 86 to prevent binding against the bolts 104 although the springs 108 will tend to prevent such a binding.

An anchoring loop 114 is secured to one of the legs 74 and receives a clip 116 at the free end of a chain or flexible element 118 that is fixed at one end to the other of the legs 74. This chain 118 will prevent the legs 74 from spreading.

Means is provided for braking the rear wheel 24 and this means comprises a conventional and well known friction brake 120 that is operated by a pull cord or element 122 which is slidably received in suitable guides or a guide 124. A bell crank lever 126 pivoted on the bicycle frame 128 and connected to the element 122 and a hand operated lever 130 mounted on the handle bar 132 is operatively connected to the lever 126 for operating the same to move the brake 120 to a braking position.

The above mentioned braking mechanism is conventional and well known for certain types of bicycles and does not form the subject matter of the instant invention. However, since the bicycle is to be stopped at certain points during its travel as an operator pulls the same a brake operating mechanism 134 is associated with the forward support 28 and the lever 126.

The braking mechanism 134 includes a pull rod or bar 136 one end of which is connected by a rod or wire 138 to a lever 140 pivoted on the frame 128 and which in turn is connected to the lever 126 by a rod or cord 142.

A guide 144 suitably secured to the forward support 28 is provided with a substantially rectangular opening 146 that slidably receives the rod 136 and the lower wall of the opening 146 is provided with a tooth 148 for selective engagement with the teeth on the toothed edge 150 of the rod 136.

A spring member 152 mounted in the opening 146 normally urges a selected tooth of the bar 136 into locking engagement with the tooth 148.

To apply the brakes partially or completely, the rod 136 is raised to clear the tooth 148 and pulled forwardly until the brakes are applied whereupon the rod 136 is released and the spring 152 urges the same to a locked position with the tooth 148.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a bicycle construction including a forward fork, forward and rear axles, a rear panel and a wheel brake, a towing attachment comprising a forward support mounted on the forward fork and forward axle, a hand receiving lever pivotally and removably secured to said forward support, a rear support mounted on the rear axle and the panel, a wheeled frame carried by said rear support, and means slidably carried by said forward support and operatively connected to the brake for actuating the latter, and means for locking said wheeled frame relative to said rear support in a raised or lowered position, said locking means including a plate fixed to said rear support and having an arcuate edge and a peripheral notch provided in said edge, a locking pin fixed to said frame and received in said notch.

2. In a bicycle including a front steering fork, an axle on said fork and a brake mechanism for the rear wheel of the bicycle and including an operator, an attachment for the bicycle comprising a frame attached to the axle and the fork, a lever, means pivotally and removably securing the lever to the frame, and an auxiliary brake operator mounted on the frame and connected to the brake mechanism.

3. In a bicycle having a carrying panel at the rear thereof, a steadying device comprising a stationary section secured to the carrying panel, a vertically swingable section hingedly carried by the stationary section, wheels supported on said swingable section, and locking means between the two sections for retaining the movable section lowered and the wheels in contact with the ground, said locking means including a fixed plate carried by said stationary section and having an arcuate edge, a guide pin carried by said movable section, and a peripheral notch in said arcuate edge receiving said pin.

4. The combination of claim 3 and means forming part of said locking means and yieldingly urging said movable section against said fixed plate.

5. In a bicycle having a carrying panel at the rear thereof, a steadying device comprising a stationary section secured to the carrying panel, a vertically swingable section hingedly carried by the stationary section, wheels supported on said swingable section, and locking means between the two sections for retaining the movable section lowered and the wheels in contact with the ground, said locking means including a fixed plate carried by said stationary section and having an arcuate edge, a guide pin carried by said movable section, said edge having a notch receiving said pin, said plate having a substantially vertical bearing surface and a vertically inclined bearing surface, said movable section including an arm pivoted at one end to the plate and having an inclined extension, said extension bearing against the vertical surface and the pivoted end of said arm bearing against the inclined surface of the plate when the arm is lowered to retain the arm in a vertically inclined position, said extension bearing against the inclined surface of the plate and the pivoted end of said arm bearing against the vertical surface of said plate to retain the arm in a substantially vertical position when the arm is raised.

6. A steadying attachment for bicycle frames, said attachment comprising a stationary frame member adapted to be removably secured to the rear of a bicycle, a pair of side by side plates fixed to said frame member, each of said plates having a flat vertical upper surface and a downwardly and outwardly inclined lower surface, a horizontal pin projecting from each plate at the juncture of said upper and lower surfaces, a pair of arms having first ends pivotally and slidably mounted on said pins, angulated extensions at the first ends of said arms, said arms also including second ends, a wheel supported by the second end of each arm, a connection between the second ends of said arms, whereby the arms may be pivoted as a unit, springs on said pins urging said arms against said plates, said first ends of said arms resting against said inclined surfaces when the arms are pivoted downwardly to position the wheels in contact with the ground and said extensions resting against said vertical surfaces when the first ends of the arms rest against said inclined surfaces, and said first ends of said arms resting against said vertical surfaces and said extensions resting against said vertically inclined surfaces when the arms are raised to position the second ends of said arms closer together than when the arms are lowered.

7. The combination of claim 6 and a pin secured to and projecting laterally from each arm and toward the plates, said plates each having a pair of notches selectively accommodating said pins when the arms are selectively raised and lowered.

ROBERT H. COVINGTON.

REFERENCES CITED

The following references are of record in the file of this patent:

UNITED STATES PATENTS

| Number | Name | Date |
| --- | --- | --- |
| Re. 18,424 | Hess | Apr. 12, 1932 |
| 505,776 | Perkins | Sept. 26, 1893 |
| 508,490 | Snyder | Nov. 14, 1893 |
| 807,409 | Whitaker | Dec. 12, 1905 |
| 862,936 | Phillips | Aug. 13, 1907 |
| 1,381,861 | Davis | June 14, 1921 |
| 1,949,962 | Hess | Mar. 6, 1934 |
| 2,030,753 | McDonnell | Feb. 11, 1936 |
| 2,160,034 | Schwinn | May 30, 1939 |
| 2,280,734 | Tyler | Apr. 21, 1942 |